United States Patent [19]

Kishino et al.

[11] 4,386,146

[45] May 31, 1983

[54] DYE SENSITIZED TITANIUM DIOXIDE ELECTROPHOTOGRAPHIC PHOTOSENSITIVE MATERIALS

[75] Inventors: Shigeru Kishino; Shigeo Yasui, both of Okayama; Kei Takahata; Masakuni Ohkawa, both of Moriyama, all of Japan

[73] Assignee: Ishihara Sangyo Kaisha, Ltd., Osaka, Japan

[21] Appl. No.: 312,978

[22] Filed: Oct. 20, 1981

[30] Foreign Application Priority Data

Oct. 23, 1980 [JP] Japan ............................. 55-148550

[51] Int. Cl.³ ............................................. G03G 5/09
[52] U.S. Cl. .................................................. 430/95
[58] Field of Search ................. 430/93, 95, 582, 583, 430/584, 585, 586

[56] References Cited

U.S. PATENT DOCUMENTS 3,414,410 12/1968 Bartlett et al. ................. 430/585 X
3,619,154 11/1971 Cavagna et al. ..................... 430/93
3,622,317 11/1971 Bird et al. ..................... 430/586 X

OTHER PUBLICATIONS

Sprague et al., "Dye Sensitization of Photosensitive Titanium Dioxide", Photo. Sci. and Engr., vol. 14, No. 6, Nov.-Dec. 1970, pp. 401–406.

*Primary Examiner*—Roland E. Martin, Jr.
*Attorney, Agent, or Firm*—Cushman, Darby & Cushman

[57] ABSTRACT

In an electrophotographic photosensitive material comprising an electroconductive substrate having positioned thereon a photosensitive layer comprising as main components titanium dioxide and a binding material, the photosensitivity and whiteness can be improved by allowing a specific cyanine dye compound to exist in said photosensitive layer.

18 Claims, No Drawings

DYE SENSITIZED TITANIUM DIOXIDE ELECTROPHOTOGRAPHIC PHOTOSENSITIVE MATERIALS

This invention relates to an electrophotographic photosensitive material wherein titanium dioxide is used as an inorganic photoconductor, and which has an improved photosensitivity and whiteness.

Titanium dioxide as an inorganic photoconductor is particularly suitable for use as a photosensitive material of the so-called CPC type that a toner image is directly formed and fixed on the photosensitive layer not through the course of transfer, because a high quality image excellent in tone reproduction is easy to obtain and titanium dioxide has properties as a high class white pigment. Nevertheless, it has not yet been used extensively in practice because it is inferior in photosensitivity to other photoconductors such as zinc oxide and the like.

On the other hand, it is also well known to add various sensitizing dyes for the purpose of increasing the photosensitivity of inorganic photoconductors. However, titanium dioxide is considerably different in photoconductive behavior from practically used photoconductors such as zinc oxide, so that it cannot necessarily be expected to be sensitized by known sensitizing dyes. Furthermore, there is a great danger that the coloration with a dye can diminish the characteristic whiteness of titanium dioxide. For these reasons, it has hitherto been desired to develop a sensitizer suitable to blend into electrophotographic photosensitive materials in which titanium dioxide is used. The expectation of the practical application of color electrophotography using titanium dioxide as a photoconductor has recently be particularly increased, and the electrophotographic photosensitive material used therein has been desired to have a high photosensitivity over a wide wavelength region. However, the improvement of the electrophotographic photosensitive material using titanium dioxide in photosensitivity particularly in a long wavelength region has not yet been satisfactory.

The object of this invention is to provide an electrophotographic photosensitive material which comprises as main components titanium dioxide and a binding material and which is markedly high in photosensitivity in a long wavelength region and has maintained substantially the whiteness of titanium dioxide.

This invention is based on the finding that, by using the specific cyanine dye represented by the general formula (I), which will appear hereinafter, i.e. a cyanine dye having a polar group such as carboxyl group, sulfo group, hydroxyl group or the like in its structure and having a maximum absorption in a wavelength region of not less than 600 nm, the sensitivity of titanium dioxide to lights ranging from visible region to near infrared region can be improved, the whiteness of the photosensitive layer is not substantially injured, and further the charging characteristics are not substantially deteriorated.

According to this invention, there is provided an electrophotographic photosensitive material comprising an electroconductive substrate having positioned thereon a photosensitive layer comprising, as main components, titanium dioxide and a binding material, characterized in that said photosensitive layer contains at least one cyanine dye represented by the general formula (I):

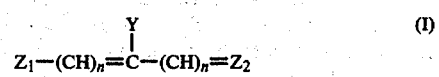

wherein:

$Z_1$ is

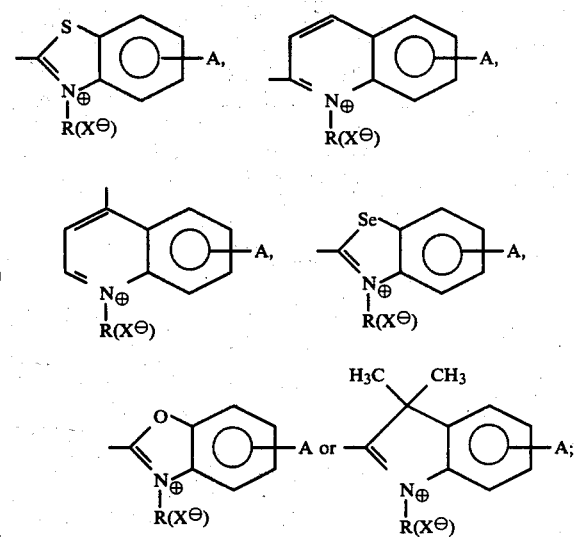

$Z_2$ is

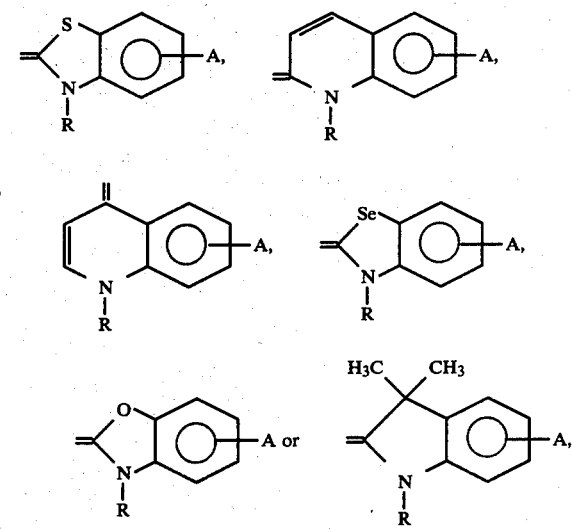

in which

A is a hydrogen atom, a halogen atom, a hydroxyl group, an alkyl group, an alkoxy group, an alkoxycarbonyl group, a carboxyl group or a salt or anion thereof, a phenyl group, or an atomic group forming an aromatic six-membered ring in conjunction with the carbon atoms in the 4- and 5-positions, the 5- and 6-positions or the 6- and 7-positions of the ring, provided that, when the R groups in both $Z_1$ and $Z_2$ are alkyl groups, the A groups in at least one of $Z_1$ and $Z_2$ are carboxyl groups or salts or anions thereof;

R is a carboxyalkyl group, a sulfoalkyl group or a salt or anion thereof, a hydroxyalkyl group, or an alkyl group;

$X^{\ominus}$ is the acid anion residue which exists only where the nitrogen atom in the ring is a cation center and neither R nor A forms an anion;

Y is a hydrogen atom, a halogen atom or an alkyl group; and n is an integer of 1–3.

In the formula mentioned above, (1) the term "carboxyl group or a salt or anion thereor" means —COOH, —COOM or —COO$^{\ominus}$ wherein M is a salt-forming cation; the term "carboxyalkyl group or a salt or anion thereof" means —Alk-COOH, —Alk-COOM or —Alk-COO$^{\ominus}$ wherein Alk is an alkyl group and M is as defined above; and the term "sulfoalkyl group or a salt or anion thereof" means —Alk-SO$_3$H, —Alk-SO$_3$M or —Alk-SO$_3^{\ominus}$ wherein Alk and M are as defined above;

(2) $X^{\ominus}$ is an acid anion residue including, for example, halogens such as chlorine, bromine, iodine and the like, ethyl sulfonate, p-toluenesulfonate and the like; and (3) the compound represented by the above-mentioned general formula (I) has a conjugated double bond structure in its molecule.

Among the compounds represented by the above-mentioned general formula (I), those having a carboxyl group or a salt or anion thereof; a carboxyalkyl group or a salt or anion thereof; a hydroxyl group; or a hydroxy-alkyl group as the substituent are excellent in sensitizing effect, and therefore, more preferable as the sensitizing dye for the electrophotographic photosensitive material of this invention.

Specific examples of the cyanine dye represented by the above-mentioned general formula (I) and their maximum absorption wavelengths are shown in Table 1.

TABLE 1

| Compound No. | Structural formula | Maximum absorption wavelength, $\lambda_{max}$ (nm) |
|---|---|---|
| No. 1 | HO(CH$_2$)$_2$—N$^{\oplus}$ Br$^{\ominus}$ [naphthyl]—CH=CH—CH=[quinolyl] N—(CH$_2$)$_2$OH | 707 |
| No. 2 | HOOC(CH$_2$)$_2$—N$^{\oplus}$ Br$^{\ominus}$ [naphthyl]—CH=CH—CH=[quinolyl] N—C$_2$H$_5$ | 708 |
| No. 3 | H$_3$C—N[quinolyl-CH$_3$]=CH—CH=CH—[quinolyl-CH$_3$]N$^{\oplus}$—CH$_2$COO$^{\ominus}$ | 714 |
| No. 4 | H$_9$C$_4$—N$^{\oplus}$ I$^{\ominus}$ [quinolyl-OCH$_3$]—CH=CH—CH=[quinolyl-OCH$_3$] N(CH$_2$)$_2$COOH | 729 |
| No. 5 | HOOC(CH$_2$)$_2$—N$^{\oplus}$ Br$^{\ominus}$ [naphthyl-Cl]—CH=CH—CH=[quinolyl-Cl] N(CH$_2$)$_2$COOH | 727 |

TABLE 1-continued
| Compound No. | Structural formula | Maximum absorption wavelength, $\lambda_{max}$ (nm) |
|---|---|---|
| No. 6 | 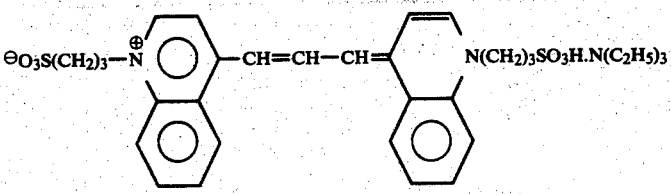 | 712 |
| No. 7 | 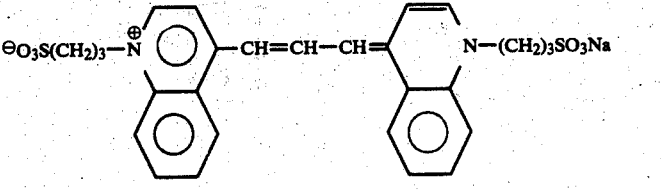 | 712 |
| No. 8 | 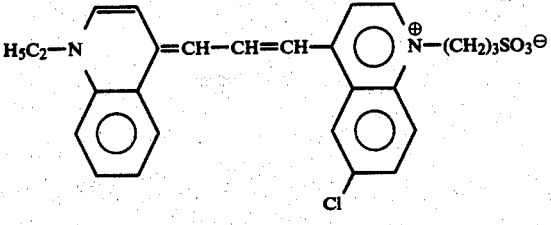 | 719 |
| No. 9 | 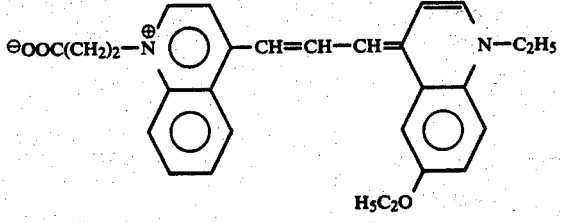 | 715 |
| No. 10 | 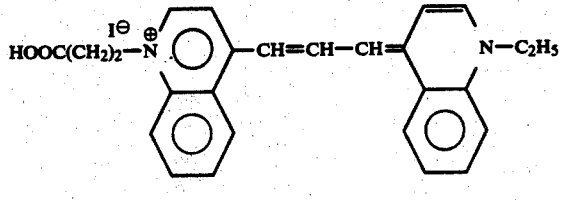 | 709 |
| No. 11 | 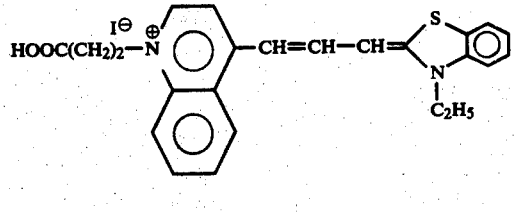 | 629 |
| No. 12 | 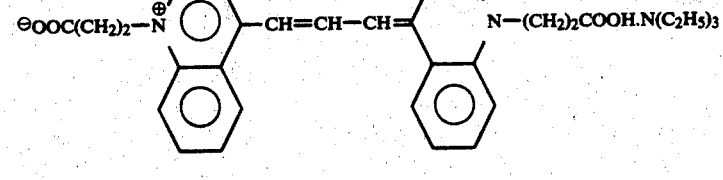 | 710 |

TABLE 1-continued

| Compound No. | Structural formula | Maximum absorption wavelength, $\lambda_{max}$ (nm) |
|---|---|---|
| No. 13 | benzothiazole-CH=CH-CH=benzothiazole dimer with N⁺-(CH₂)₃SO₃⁻ and N-C₂H₅ substituents | 603 |
| No. 14 | 6-methylbenzothiazole (N⁺-(CH₂)₂COOH, Br⁻) -CH=CH-CCl=CH-CH=quinoline (N-C₂H₅) | 715 |
| No. 15 | 5-methoxybenzothiazole (N⁺-(CH₂)₂COOH·N(C₂H₅)₃) -CH=CH-CH=CH-CH=quinoline (N-(CH₂)₂COO⁻) | 740 |
| No. 16 | 5-methoxybenzothiazole (N⁺-(CH₂)₂COO⁻) -CH=CH-CH=CH-CH=quinoline (N-C₂H₅) | 743 |
| No. 17 | benzothiazole (N⁺-(CH₂)₂COO⁻) -CH=CH-CH=CH-CH=6-methylquinoline (N-C₂H₅) | 735 |
| No. 18 | benzothiazole (N⁺-C₅H₁₁) -CH=CH-CH=CH-CH=6-chloroquinoline (N-CH₂-COO⁻) | 749 |
| No. 19 | benzothiazole (N⁺-CH₂COO⁻) -CH=CH-CBr=CH-CH=quinoline (N-C₂H₅) | 718 |

TABLE 1-continued

| Compound No. | Structural formula | Maximum absorption wavelength, $\lambda_{max}$ (nm) |
|---|---|---|
| No. 20 | benzothiazole(N-C$_2$H$_5$)-CH=CH-CH=CH-CH=quinoline(N$^\oplus$-(CH$_2$)$_2$COOH) I$^\ominus$ | 727 |
| No. 21 | H$_3$C-benzothiazole(N$^\oplus$-(CH$_2$)$_2$COOH, Br$^\ominus$)-CH=CH-CH=CH-CH=quinoline(N-C$_2$H$_5$) | 740 |
| No. 22 | naphthothiazole(N$^\oplus$-(CH$_2$)$_3$SO$_3^\ominus$)-CH=CH-CH=CH-CH=quinoline(N-(CH$_2$)$_2$COOH·N(C$_2$H$_5$)$_3$) | 760 |
| No. 23 | benzothiazole(N$^\oplus$-C$_2$H$_5$, Br$^\ominus$)-CH=CH-C(CH$_3$)=CH-CH=quinoline(N-(CH$_2$)$_2$COOH) | 726 |
| No. 24 | benzothiazole(N$^\oplus$-C$_2$H$_5$)-CH=CH-C(CH$_3$)=CH-CH=quinoline(N-(CH$_2$)$_3$SO$_3^\ominus$, Cl) | 747 |
| No. 25 | CH$_3$OOC-benzothiazole(N$^\oplus$-C$_4$H$_9$, CH$_3$-C$_6$H$_4$-SO$_3^\ominus$)-CH=CH-CH=CH-CH=quinoline(N-(CH$_2$)$_2$COOH) | 732 |
| No. 26 | HOOC-benzothiazole(N$^\oplus$-C$_2$H$_5$, I$^\ominus$)-CH=CH-CH=CH-CH=quinoline(N-C$_2$H$_5$) | 732 |

TABLE 1-continued

| Compound No. | Structural formula | Maximum absorption wavelength, $\lambda_{max}$ (nm) |
| --- | --- | --- |
| No. 27 | | 726 |
| No. 28 | | 725 |
| No. 29 | | 800 |
| No. 30 | | 820 |
| No. 31 | | 712 |
| No. 32 | | 720 |
| No. 33 | | 725 |

TABLE 1-continued

| Compound No. | Structural formula | Maximum absorption wavelength, $\lambda_{max}$ (nm) |
|---|---|---|
| No. 34 | | 730 |
| No. 35 | | 740 |
| No. 36 | | 713 |
| No. 37 | | 746 |
| No. 38 | | 713 |
| No. 39 | | 710 |
| No. 40 | | 715 |
| No. 41 | | 770 |

TABLE 1-continued

| Compound No. | Structural formula | Maximum absorption wavelength, $\lambda_{max}$ (nm) |
|---|---|---|
| No. 42 | [dihydroquinolinium(N-CH₃)]—CH=CH—CH=CH—CH=[dihydroquinoline, 6-CH₃]—N—CH₂COO⁻ | 761 |
| No. 43 | [tetrahydroquinolinium(N-C₃H₇), I⁻]—CH=CH—CH=CH—CH=[tetrahydroquinoline]—N—(CH₂)₂COOH | 760 |
| No. 44 | [benzothiazolium, N-CH₂COONa, I⁻]—CH=CH—C(Br)=CH—CH=[benzothiazole, N-CH₂COONa] | 648 |
| No. 45 | [benzothiazolium, N-CH₂COOH, Cl⁻]—CH=CH—C(Br)=CH—CH=[benzothiazole, N-CH₂COOH] | 648 |
| No. 46 | [benzothiazolium, N-CH₂COONH₄, I⁻]—CH=CH—C(Br)=CH—CH=[benzothiazole, N-CH₂COONH₄] | 648 |
| No. 47 | [benzothiazolium, N-(CH₂)₂COOH, Cl⁻]—CH=CH—CH=CH—CH=[benzothiazole, N-(CH₂)₂COOH] | 659 |
| No. 48 | [benzothiazolium, N-(CH₂)₂COO⁻]—CH=CH—C(Cl)=CH—CH=[benzothiazole, N-(CH₂)₂COONa] | 652 |
| No. 49 | [benzothiazolium, N-CH₂COOH, Cl⁻]—CH=CH—CH=CH—CH=[benzothiazole, N-CH₂COOH] | 658 |
| No. 50 | [benzothiazolium, N-(CH₂)₂COO⁻]—CH=CH—C(Br)=CH—CH=[benzothiazole, N-(CH₂)₂COONa] | 649 |
| No. 51 | [6-CH₃-benzothiazolium, N-(CH₂)₂COO⁻]—CH=CH—C(Br)=CH—CH=[6-CH₃-benzothiazole, N-(CH₂)₂COONa] | 654 |

TABLE 1-continued

| Compound No. | Structural formula | Maximum absorption wavelength, $\lambda_{max}$ (nm) |
| --- | --- | --- |
| No. 52 | Benzothiazole dimer with -CH=CH-CBr=CH-CH= methine bridge; N-substituents: $(CH_2)_2COOH$ both sides; 6-methyl on both benzothiazoles; $Cl^\ominus$ counterion | 654 |
| No. 53 | Benzothiazole dimer with -CH=CH-CH=CH-CH= methine bridge; N-ethyl both sides; 5-COOH (one as $^\ominus OOC$) on both rings | 655 |
| No. 54 | Benzothiazole dimer with -CH=CH-CH=CH-CH= methine bridge; N-ethyl both sides; 5-COOH (one as $^\ominus OOC$) on both rings (one ring partially hydrogenated) | 655 |
| No. 55 | 3,3-Dimethylindolenine dimer with -CH=CH-CH=CH- methine bridge; N-$CH_2COOH$ both sides; $I^\ominus$ counterion | 649 |
| No. 56 | 3,3-Dimethylindolenine dimer with -CH=CH-CCl=CH- methine bridge; N-$CH_2COOH$ both sides; $I^\ominus$ counterion | 644 |
| No. 57 | 3,3-Dimethylindolenine dimer with -CH=CH-CBr=CH-CH= methine bridge; N-$CH_2COOH$ both sides; $I^\ominus$ counterion | 642 |
| No. 58 | Benzothiazole dimer with -CH=CH-CH=CH-CH= methine bridge; N-$(CH_2)_3SO_3^\ominus$ / N-$(CH_2)_2SO_3H \cdot N(C_2H_5)_3$; 6-methyl both sides | 664 |
| No. 59 | Benzothiazole dimer with -CH=CH-CH=CH-CH= methine bridge; N-$(CH_2)_2COO^\ominus$ / N-$(CH_2)_2COOH$; 6-methyl both sides | 661 |
| No. 60 | Benzothiazole dimer with -CH=CH-CBr=CH-CH= methine bridge; N-$CH_2COO^\ominus$ / N-$CH_2COONa$; 6-methyl both sides | 656 |
| No. 61 | Benzothiazole dimer with -CH=CH-CBr=CH-CH= methine bridge; N-$(CH_2)_2COO^\ominus$ / N-$(CH_2)_2COONa$; 6-chloro both sides | 658 |

TABLE 1-continued

| Compound No. | Structural formula | Maximum absorption wavelength, $\lambda_{max}$ (nm) |
| --- | --- | --- |
| No. 62 | benzothiazole-CH=CH-C(Br)=CH-CH=benzothiazole, both rings with 6-OCH$_3$; N-substituents: (CH$_2$)$_2$COO$^\ominus$ and (CH$_2$)$_2$COOH | 663 |
| No. 63 | benzothiazole-CH=CH-CH=CH-CH=benzothiazole; N-substituents: (CH$_2$)$_3$SO$_3^\ominus$ and (CH$_2$)$_3$SO$_3$H | 658 |
| No. 64 | benzothiazole-CH=CH-C(Cl)=CH-CH=benzothiazole; N-substituents: (CH$_2$)$_3$SO$_3^\ominus$ and (CH$_2$)$_3$SO$_3$H | 652 |
| No. 65 | 3,3-dimethylindolenine-CH=CH-CH=CH-CH=3,3-dimethylindolenine; N-substituents: (CH$_2$)$_3$SO$_3$Na and (CH$_2$)$_3$SO$_3$Na; I$^\ominus$ | 645 |
| No. 66 | 1,1-dimethylbenz[e]indolenine-CH=CH-CH=CH-CH=1,1-dimethylbenz[e]indolenine; N-substituents: (CH$_2$)$_4$SO$_3$Na and (CH$_2$)$_4$SO$_3$Na; I$^\ominus$ | 681 |
| No. 67 | quinoline-CH=CH-CH=CH-CH=quinoline; N-substituents: (CH$_2$)$_3$SO$_3^\ominus$ and (CH$_2$)$_3$SO$_3$Na | 715 |
| No. 68 | quinoline-CH=CH-CH=CH-CH=quinoline; N-substituents: CH$_2$COO$^\ominus$ and CH$_2$COOH | 713 |
| No. 69 | benzothiazole-CH=CH-CH=CH-CH=CH-CH=benzothiazole; N-substituents: (CH$_2$)$_2$COOH and (CH$_2$)$_2$COOH; Cl$^\ominus$ | 764 |
| No. 70 | benzothiazole-CH=CH-CH=C(CH$_3$)-CH=CH-CH=benzothiazole; N-substituents: (CH$_2$)$_2$COO$^\ominus$ and (CH$_2$)$_2$COOH·HN(piperidine) | 789 |
| No. 71 | benzothiazole-CH=CH-CH=CH-CH=CH-CH=benzothiazole; N-substituents: (CH$_2$)$_3$SO$_3^\ominus$ and (CH$_2$)$_3$SO$_3$Na | 763 |

TABLE 1-continued

| Compound No. | Structural formula | Maximum absorption wavelength, $\lambda_{max}$ (nm) |
|---|---|---|
| No. 72 | Benzothiazole-CH=CH-CH=CH-CH=CH-CH=benzothiazole; left: Cl, N⊕-CH₂COO⊖; right: Cl, N-CH₂COOH·N(C₂H₅)₃ | 770 |
| No. 73 | Benzothiazole-CH=CH-CH=CH-CH=CH-CH=benzothiazole; left: Cl, N⊕-(CH₂)₂COOH, I⊖; right: Cl, N-C₂H₅ | 768 |
| No. 74 | Benzothiazole-CH=CH-CH=CH-CH=CH-CH=benzothiazole; left: H₃CO, N⊕-CH₂COOH, Br⊖; right: OCH₃, N-C₄H₉ | 778 |
| No. 75 | Benzothiazole(naphtho)-CH=CH-CH=CH-CH=CH-CH=benzothiazole(naphtho); left: N⊕-(CH₂)₂COO⊖; right: N-C₂H₅ | 799 |
| No. 76 | Indolenine (H₃C, CH₃)-CH=CH-CH=CH-CH=CH-CH=indolenine (H₃C, CH₃); left: N⊕-CH₂COOH, Cl⊖; right: N-CH₂COOH | 743 |
| No. 77 | Indolenine (H₃C, CH₃)-CH=CH-CH=CH-CH=CH-CH=indolenine (H₃C, CH₃); left: N⊕-(CH₂)₃SO₃⊖; right: N-(CH₂)₃SO₃K | 752 |
| No. 78 | Benzoselenazole-CH=CH-CH=CH-CH=CH-CH=benzoselenazole; left: H₃C, N⊕-CH₂COO⊖; right: CH₃, N-CH₂COOH·HN(piperidine) | 783 |
| No. 79 | Benzoselenazole-CH=CH-CH=CH-CH=CH-CH=benzoselenazole; left: N⊕-(CH₂)₂COOH, I⊖; right: N-C₃H₇ | 773 |
| No. 80 | Dihydroquinoline-CH=CH-CH=CH-CH=CH-CH=dihydroquinoline; left: Br⊖, ⊕N-(CH₂)₂COOH; right: N-C₂H₅ | 818 |
| No. 81 | Benzothiazole-CH=CH-CH=CH-CH=CH-CH=benzothiazole; left: HO, N⊕-(CH₂)₂COO⊖; right: OH, N-(CH₂)₂COOH·N(C₂H₅)₃ | 780 |

The maximum absorption wavelengths ($\lambda_{max}$, nm) of the above-mentioned compounds are values as measured in methanol. When the dye was not readily soluble, a small amount of hydrobromic acid or triethylamine was added to dissolve the dye, and then the measurement was carried out.

Usually, the above-mentioned cyanine dyes are synthesized by the following method:

The quaternary ammonium salt of heterocyclic compound corresponding to $Z_1$ in the general formula (I) and having an active methyl group at the position to be substituted is reacted with an alkenedianil or its derivative, or an alkoxyalkane or its derivative with heating in the absence of a solvent or in the presence of a solvent such as an alcohol, a pyridine or the like and optionally in the presence of a base such as triethylamine, piperidine or the like to obtain a compound represented by the general formula (II) or the formula (III):

when n is 1 or 3,

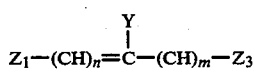  (II)

when n is 2

  (III)

wherein $Z_1$, Y and n are as defined above; m is (n−1); and $Z_3$ is an anilino or alkoxy group. When $Z_3$ in the general formula (II) or the formula (III) is an anilino group, it can optionally be converted into a compound represented by the general formula (IV) or the formula (V) by reacting it with acetic anhydride in the presence of ethyl orthoformate or triethylamine:

when n is 1 or 3,

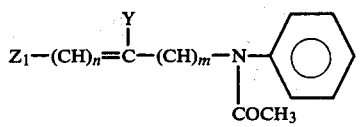  (IV)

when n is 2,

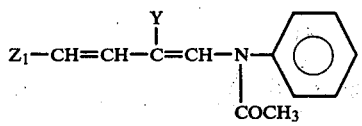  (V)

wherein $Z_1$, Y, m and n are as defined above. Then, the compound represented by the general formula (II) or the formula (III) or the compound represented by the general formula (IV) or the formula (V) is reacted with the quaternary ammonium salt of heterocyclic compound corresponding to $Z_2$ in the general formula (I) and having an active methyl group at the position to be substituted, with heating in a solvent such as an alcohol, pyridine, acetic anhydride or the like in the presence of a base such as triethylamine, piperidine, potassium acetate or the like to obtain the compound represented by the general formula (I).

When $Z_1$ and $Z_2$ in the general formula (I) have the same chemical structure, it is also possible to obtain in one step the compound represented by the general formula (I) by reacting, with heating, the quaternary ammonium salt of heterocyclic compound corresponding to $Z_1$ in the general formula (I) and having an active methyl group at the position to be substituted with an alkenedianil derivative or an alkoxyalkane derivative in the absence of a solvent or in the presence of a solvent such as an alcohol, pyridine or the like and optionally in the presence of a base such as triethylamine, piperidine or the like.

Specific synthesis examples will be mentioned below.

SYNTHESIS EXAMPLE 1

Synthesis of 1-(2-carboxyethyl)-4-[3-(1-ethyl-1,4-dihydroquinolin-4-ylidene)-1-propen-1-yl]-quinolinium iodide (Compound No. 10)

In an oil bath, 3.6 g of 1-ethyl-4-methylquinolinium iodide was reacted with 2.4 g of diphenylformamidine at 165° C. for 30 minutes. After completion of the reaction, the reaction product was cooled and washed with diethyl ether, after which it was boiled in ethanol, cooled and filtered with suction, to obtain 4.2 g of dark brown crystals of 4-(2-anilinovinyl)-1-ethylquinolinium iodide (melting point 200° C.).

To reaction were subjected 4 g of 4-(2-anilinovinyl)-1-ethylquinolinium iodide, 6 ml of acetic anhydride and 3 ml of ethyl orthoformate with stirring at 100° C. for 15 minutes. After completion of the reaction, the reaction product was cooled and filtered with suction to obtain 3.6 g of crude crystals. It was recrystallized from ethanol to obtain 2.5 g of yellowish brown crystals of 4-(2-acetoanilidovinyl)-1-ethylquinolinium iodide (melting point 209° C.).

In 20 ml of ethanol were dissolved 2.2 g of the 4-(2-acetoanilidovinyl)-1-ethylquinolinium iodide obtained by the above-mentioned reaction and 1.5 g of 1-(2-carboxyethyl)-4-methylquinolinium bromide were dissolved, and 1 g of triethylamine was added to the resulting solution, after which the mixture was subjected to reaction with heating under reflux for 30 minutes. After completion of the reaction, the reaction product was cooled, and diethyl ether was added thereto, after which the resulting precipitate was collected by filtration to obtain a crude dye. Then, it was boiled together with ethanol to obtain 1.6 g of crystals, and the crystals were recrystallized from methanol containing a small quantity of hydroiodic acid to obtain 0.6 g of the objective compound (melting point 221° C.) which was greenish golden. Its maximum absorption wavelength as measured in triethylamine-containing methanol was 709 nm.

SYNTHESIS EXAMPLE 2

Synthesis of triethylammonium 3-[[2-{5-[1-(2-carboxyethyl)-1,4-dihydroquinolin-4-ylidene]-1,3-pentadien-1-yl}-naphtho[1,2-d]thiazolin-1-yl]]-propane-1-sulfonate (Compound No. 22)

A solution of 3 ml of triethylamine in 100 ml of dimethylsulfoxide was added to 4 g of 1-(2-carboxyethyl)-4-(4-anilino-1,3-butadien-1-yl)-quinolinium bromide and 3 g of 3-(2-methylnaphtho[1,2-d]thiazolin-1-yl)-propane-1-sulfonate and the resulting mixture was subjected to reaction at 100° C. for 2 hours. After completion of the reaction, the reaction product was cooled, and diethyl ether was added, after which the resulting precipitate was collected by filtration to obtain a crude dye. It was boiled together with ethanol to obtain crystals, and the crystals were recrystallized from methanol containing a small quantity of triethylamine to obtain 0.9 g of the objective compound (melting point 219° C.) which was dark green. Its maximum absorption wavelength as measured in triethylamine-containing methanol was 760 nm.

SYNTHESIS EXAMPLE 3

Synthesis of 1-ethyl-4-[5-{3-(2-carboxyethyl)-6-methylbenzothiazolin-2-ylidene}-1,3-pentadien-1-yl]-quinolinium bromide (Compound No. 21)

To reaction were subjected 3.7 g of 3-(2-carboxyethyl)-2,6-dimethylbenzothiazolium bromide, 4.3 g of 4-(4-anilino-1,3-butadien-1-yl)-1-ethylquinolinium bromide, 150 ml of ethanol and 5 ml of triethylamine under reflux for one hour. After completion of the reaction, the reaction product was cooled, and the crude crystals thus obtained were purified by means of methanol to obtain 0.9 g of the objective compound (melting point 190° C.) which was glittering green. Its maximum absorption wavelength as measured in triethylamine-containing methanol was 740 nm.

SYNTHESIS EXAMPLE 4

Synthesis of 1-(2-carboxyethyl)-4-[5-(3-ethylbenzothiazolin-2-ylidene)-1,3-pentadien-1-yl]-quinolinium iodide (Compound No. 20)

To reaction were subjected 11 g of 1-(2-carboxyethyl)-4-methylquinolinium bromide, 14 g of 2-(4-acetoanilido-1,3-butenyliden-1-yl)-3-ethylbenzothiazolium iodide, 200 ml of ethanol and 6 ml of triethylamine on an oil bath under reflux for one hour. After completion of the reaction, the reaction product was cooled and filtered with suction. The crystals thus obtained were washed with methanol to obtain crude crystals. The crude crystals were treated with 4 ml of 50% hydroiodic acid and 300 ml of methanol to convert them into an iodide, which was then recrystallized from methanol, to obtain 2.8 g. of the objective compound (melting point 190° C.) which was yellowish green. Its maximum absorption wavelength as measured in methanol was 727 nm.

SYNTHESIS EXAMPLE 5

Synthesis of 3-(2-carboxyethyl)-2-[7-{3-(2-carboxyethyl)-benzothiazolin-2-ylidene}-1,3,5-heptatrien-1-yl]-benzothiazolium chloride (Compound No. 69)

To reaction were subjected 6 g of 3-(2-carboxyethyl)-2-methylbenzothiazolium bromide, 2.9 g of pentadienedianil hydrochloride, 40 ml of ethanol and 43 ml of piperidine in an oil bath at 65° C. for 20 minutes. After completion of the reaction, the reaction product was cooled and filtered with suction to obtain crude crystals. The crude crystals were dissolved in triethylamine-containing methanol, and the resulting solution was filtered, after which methanol containing 10% of hydrochloric acid was added thereto to deposit crystals. By repeating this procedure twice, 1.6 g of the objective compound (melting point 159° C.) which was golden was obtained. Its maximum absorption wavelength as measured in methanol was 764 nm.

SYNTHESIS EXAMPLE 6

Synthesis of 1-(2-hydroxyethyl)-4-[3-{1-(2-hydroxyethyl)-1,4-dihydroquinolin-4-ylidene}-1-propen-1-yl]-quinolinium bromide (Compound No. 1)

On an oil bath, 2.7 g of 1-(2-hydroxyethyl)-4-methylquinolinium bromide and diphenylformamidine were heated for 5 minutes to melt them. Thereto was added 150 ml of ethanol, and the resulting mixture was boiled, upon which 1-(2-hydroxyethyl)-4-(2-anilinovinyl)-quinolinium bromide was crystallized. Then, 2.5 g of 1-hydroxyethyl-4-methylquinolinium bromide and 10 ml of triethylamine were added thereto and subjected to reaction under reflux for one hour. After completion of the reaction, the reaction product was cooled and the crude crystals thus obtained were recrystallized from methanol to obtain 2 g of the objective compound (melting point 262° C.) which was dark green. Its maximum absorption wavelength as measured in methanol was 707 nm.

SYNTHESIS EXAMPLE 7

Synthesis of triethylammonium 2-[[5-hydroxy-2-[7-{3-(2-carboxyethyl)-5-hydroxybenzothiazolin-2-ylidene}-1,3,5-heptatrien-1-yl]-benzothiazolio]]-ethane-1-carboxylate (Compound No. 81)

To a liquid mixture consisting of 10 ml of pyridine and 2 ml of piperidine were added 5.5 g of 3-(2-carboxyethyl)-5-hydroxy-2-methylbenzothiazolium bromide and 3.3 g of pentadienedianil hydrochloride, and the resulting mixture was subjected to reaction at 40° C. for 5 minutes. After completion of the reaction, the reaction product was cooled and filtered with suction to obtain crystals. After washing them with diethyl ether, they were dispersed in methanol, filtered with suction and washed with methanol and then with acetone to obtain crude crystals. The crude crystals were heated at 60° C. with stirring together with triethylamine-containing methanol, to deposit crystals, whereby 1 g of the objective compound (melting point 185° C.) which was glittering yellowish green was obtained. Its maximum absorption wavelength as measured in triethylamine-containing methanol was 780 nm.

The maximum absorption wavelengths ($\lambda_{max}$) of the above-mentioned cyanine dyes which are to be used in this invention exist in the long wavelength region ranging from the infrared side of visible region to the near infrared region, so that the light absorption by these dyes occurs in a region in which human being feel relatively slightly light as color in the case of visual observation. Nevertheless, the dyes can sensitize titanium dioxide over a wide range of visible region and give a remarkably good light sensitivity.

Particularly, those having a maximum absorption wavelength on a longer wavelength side than 700 nm, especially 700–800 nm, are more desirable as sensitizing dyes for titanium dioxide because they give the photosensitive layer substantially no coloration and are excellent in sensitizing effect.

These cyanine dyes are used usually in an amount of 0.001–0.3% by weight and preferably in an amount of 0.005–0.2% by weight based on the weight of titanium dioxide. If the amount is smaller than the above range the light sensitivity is insufficient. If the amount is larger than the above range, the photosensitive layer is colored, and a great improvement in sensitizing effect cannot be expected.

The cyanine dye of this invention can be incorporated into the photosensitive layer by any known method. For example, it may be previously fixed on the surface of titanium dioxide particles, or it may be previously mixed with a paste for forming the photosensitive layer, or it may be fixed on the photosensitive layer.

As the titanium dioxide of this invention, there may be used known titanium dioxide for electrophotography. For example, those produced by known methods such as a method by which an aqueous titanium salt solution is first hydrolyzed and then calcined, a method by which titanium tetrachloride is oxidatively decomposed at a high temperature, etc. may be used. The titanium dioxide may also be doped with various metals such as Zn, Li, Mg, Ba, Sr or the like.

As the binding material of this invention, there may usually be used known resins such as alkyd resin, acryl resin, silicone resin, amino resin, polyolefin resin, vinyl resin and the like. The binding material should be selected carefully so that it does not injure electrophotographic characteristics such as light sensitivity, charging property, charge maintenance in the dark, etc. It is usual to select a desirable binding material by trial and error.

The proportion of the titanium dioxide to the binding material, both constituting the photosensitive layer, is preferably in the range of from 25:75 to 65:35, because such a proportion generally brings about a high photosensitivity.

As the electroconductive substrate, an appropriate one may be selected from well known substrates such as metallic plate, metal-deposited paper or film, paper or film coated with an electroconductive layer containing an electroconductive resin or an electroconductive powder, and the like depending upon the object of use, and put to practical use.

Since the electrophotographic photosensitive material of this invention gives high quality image excellent in tone reproduction, it is particularly suitable for use in the formation of pictorial image by color electrophotography. Apart from the above, it is also applicable extensively to the formation of various duplicated images by electrophotography.

This invention will be explained in more detail below referring to Examples, which are not by way of limitation but by way of illustration.

EXAMPLE 1

To 10 g of titanium dioxide was added 20 ml of an ethanolic solution containing 0.003 g of the cyanine dye of compound No. 20. The resulting mixture was thoroughly kneaded and dried at 110° C. to evaporate off the ethanol. In a glass vessel having a capacity of 70 ml was put 8 g of the dye-fixed titanium dioxide thus obtained, and thereto were then added 6.4 g of a resin solution (Aroset 5804 XC, manufactured by Nisshoku Arrow Chemical Co., Ltd.), 0.16 ml of a xylene solution containing 0.03 mole percent, based on the titanium dioxide, of p-t-butylcatechol, 7 ml of xylene and 40 g of glass beads. The titanium dioxide was dispersed by shaking the vessel for 20 minutes by means of a Ked Devil paint conditioner, after which the glass beads were separated to obtain a coating composition. The coating composition was coated on an aluminum-laminate paper by means of a wire applicator and dried to obtain a photosensitive paper. Before measuring the characteristics of this photosensitive paper, it was aged in the dark for about 2 days.

The photosensitive paper thus obtained was negatively charged to 300 V by means of a scorotron charger, and then exposed to light by means of a spectrograph and subjected to toner development to obtain a spectrogram. As a result, the wavelength of maximum sensitivity was 750 nm and the wavelength range of sensitization was 630-800 nm, revealing that a good sensitization was effected on the long wavelength side. The photosensitive paper showed substantially no coloration, and retained the high whiteness of titanium dioxide pigment.

EXAMPLES 2-11

A photosensitive paper was prepared and a spectrogram was produced therefrom by repeating the procedure of Example 1, except that the cyanine dyes shown in Table 2 were used as a sensitizer. The wavelengths of maximum sensitivity and the wavelength ranges of sensitization of the photosensitive papers were as shown in Table 2, demonstrating that a good sensitization took place on every photosensitive paper. On all the photosensitive papers, the coloration was so slight as to be substantially unnoticeable.

TABLE 2

| Example No. | Number of compound used | Wavelength of maximum sensitivity (nm) | Wavelength range of sensitization (nm) |
|---|---|---|---|
| 2 | 1 | 730 | 600-820 |
| 3 | 10 | 730 | 630-770 |
| 4 | 21 | 750 | 650-820 |
| 5 | 22 | 750 | 630-820 |
| 6 | 69 | 790 | 650-850 |
| 7 | 71 | 780 | 650-830 |
| 8 | 76 | 770 | 650-810 |
| 9 | 77 | 760 | 630-800 |
| 10 | 80 | 800 | 650-840 |
| 11 | 81 | 820 | 700-850 |

EXAMPLES 12-22

The photosensitive papers of this invention prepared in Examples 1-11 were negatively charged to 300 V by means of a scorotron charger and exposed to a tungsten light through a red dichroic filter to measure the quantity of light exposure energy required for lowering the surface potential to 60 V. Further, the optical densities of these photosensitive papers were measured by means of a cyan filter to evaluate the extent of coloration. For comparison, a photosensitive paper was prepared by repeating the above-mentioned procedure, except that the sensitizing dye was not added, and it was measured similarly. The results obtained were as shown in Table 3.

TABLE 3

| Example No. | Example No. of photosensitive paper | Quantity of exposure light required for light decay down to 1/5 of the initial voltage ($\mu j/cm^2$) | Optical density |
|---|---|---|---|
| 12 | 1 | 243 | 0.12 |
| 13 | 2 | 124 | 0.15 |
| 14 | 3 | 203 | 0.10 |
| 15 | 4 | 527 | 0.09 |
| 16 | 5 | 324 | 0.13 |
| 17 | 6 | 689 | 0.09 |
| 18 | 7 | 9,801 | 0.15 |
| 19 | 8 | 2,714 | 0.11 |
| 20 | 9 | 7,965 | 0.15 |
| 21 | 10 | 1,647 | 0.10 |
| 22 | 11 | 1,985 | 0.13 |
| Comparative Example | — (No dye) | 12,582 | 0.08 |

It is understandable from Table 3 that as compared with the photosensitive paper of the Comparative Example, the photosensitive papers of this invention have a markedly increased sensitivity and are very slight in coloration.

The dyes mentioned in the Examples of the specification were synthesized in JAPANESE RESEARCH INSTITUTE FOR PHOTOSENSITIZING DYES CO., LTD.

What is claimed is:

1. An electrophotographic photosensitive material comprising an electroconductive substrate having positioned thereon a photosensitive layer comprising as main components titanium dioxide and a binding materials, characterized in that said photosensitive layer contains at least one cyanine dye represented by the general formula (I)

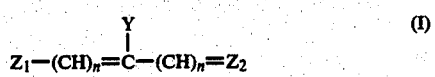

wherein Y is a hydrogen atom, a halogen atom or an alkyl group; n is an integer of 1 to 3; $Z_1$ is

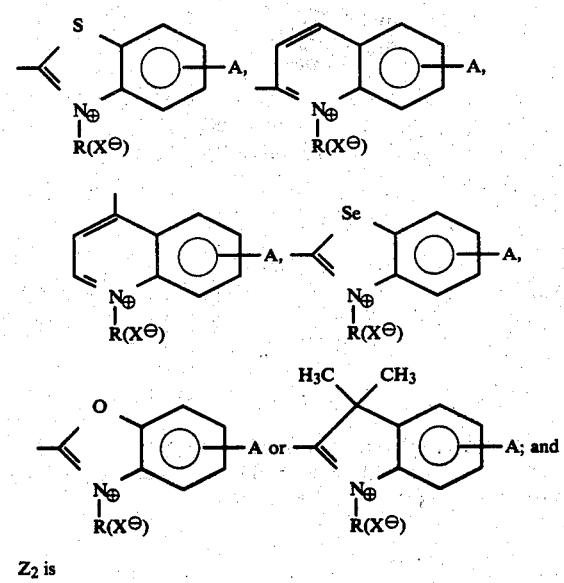

$Z_2$ is

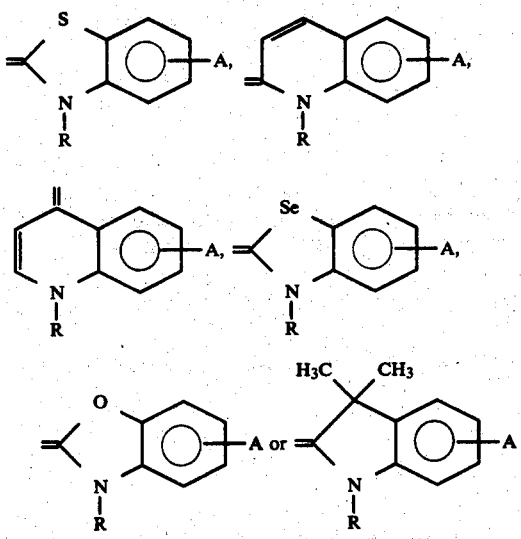

in which R is a carboxyalkyl group, a sulfoalkyl group or a salt or anion thereof, a hydroxyalkyl group, or an alkyl group; A is a hydrogen atom; a halogen atom, a hydroxyl group; an alkyl group, an alkoxy group, an alkoxycarbonyl group, a carboxyl group or a salt or anion thereof, a phenyl group, or an atomic group forming an aromatic hydrocarbon six-membered ring in conjunction with the carbon atoms in the 4- and 5-positions, the 5- and 6-positions or the 6- and 7-positions of the ring; provided that when the R groups in both $Z_1$ and $Z_2$ are alkyl groups, the A groups in at least one of $Z_1$ and $Z_2$ are carboxyl groups or salt or anions thereof; and $X^\ominus$ is the acid anion residue which exists only where the nitrogen atom in the ring is a cation center and neither R nor A forms an anion, the amount of cyanine dye being 0.001 to 0.3% by weight based on the weight of titanium dioxide.

2. An electrophotographic photosensitive material according to claim 1, wherein said cyanine dye is a compound represented by the general formula (I) wherein n is 1 or 2.

3. An electrophotographic photosensitive material according to claim 1, wherein said cyanine dye is a compound represented by the general formula (I) wherein either A is a carboxyl group or a salt or anion thereof, or a hydroxyl group; or R is a carboxyalkyl group or a salt or anion thereof, or a hydroxyalkyl group.

4. An electrophotographic photosensitive material according to claim 1, wherein said cyanine dye is a compound represented by the general formula (I) wherein $Z_1$ is $Z_1$ is

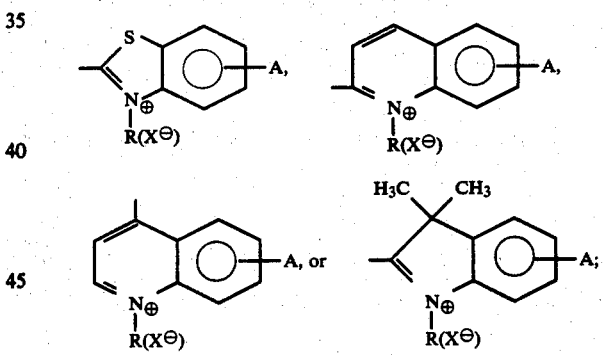

and $Z_2$ is

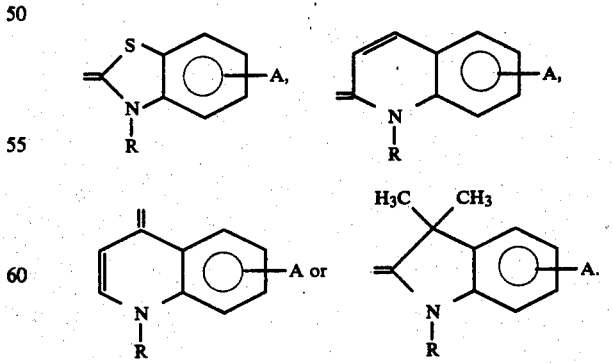

5. An electrophotographic photosensitive material according to claim 1, wherein said cyanine dye is a compound represented by the general formula (I) wherein $Z_1$ is

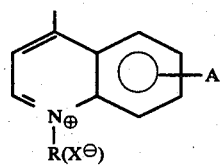

and Z₂ is

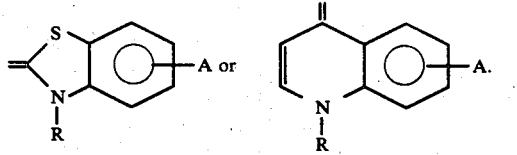

6. An electrophotographic photosensitive material according to claim 1, wherein said cyanine dye is a compound represented by the general formula (I) and its maximum absorption wavelength is 700 nm or more.

7. An electrophotographic photosensitive material according to claim 5, wherein said cyanine dye is a compound represented by the general formula and its maximum absorption wavelength is 700 nm or more.

8. An electrophotographic photosensitive material according to claim 1, wherein said cyanine dye is a compound represented by the general formula (I) and its maximum absorption wavelength is in the range of 700–800 nm.

9. An electrophotographic photosensitive material according to claim 5, wherein said cyanine dye is a compound represented by the general formula (I) and its maximum absorption wavelength is in the range of 700–800 nm.

10. An electrophotographic photosensitive material according to claim 1, wherein said cyanine dye is a compound represented by the formula:

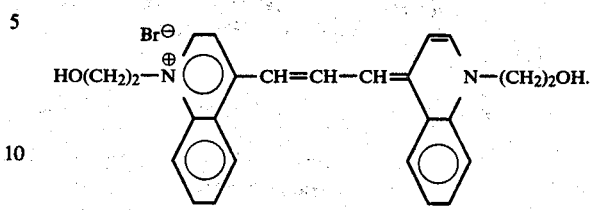

11. An electrophotographic photosensitive material according to claim 1, wherein said cyanine dye is a compound represented by the formula:

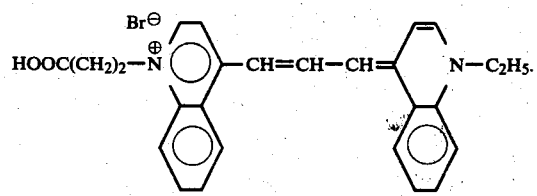

12. An electrophotographic photosensitive material according to claim 1, wherein said cyanine dye is a compound represented by the formula:

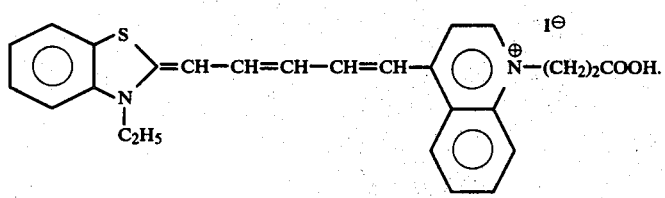

13. An electrophotographic photosensitive material according to claim 1, wherein said cyanine dye is a compound represented by the formula:

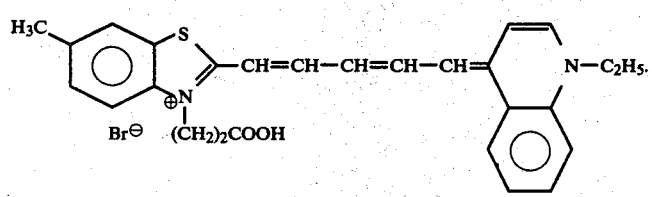

14. An electrophotographic photosensitive material according to claim 1, wherein said cyanine dye is a compound represented by the formula:

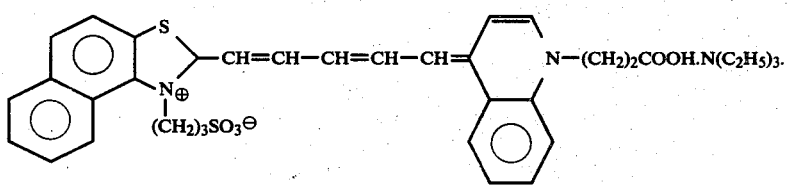

15. An electrophotographic photosensitive material according to any one of claims 1–14, wherein said photosensitive layer contains a cyanine dye in an amount of 0.005–0.2% by weight based on the weight of titanium dioxide.

16. An electrophotographic photosensitive material according to any one of claims 1–14, wherein the proportion of the titanium dioxide to the binding material, both constituting said photosensitive layer, is in the range of from 25:75 to 65:35 by volume.

17. An electrophotographic photosensitive material according to claim 1, wherein A is a carboxyl group, a salt thereof or an anion thereof.

18. An electrophotographic photosensitive material according to claim 1 or 17, wherein R is a carboxyl group, a salt thereof of an anion thereof, or a hydroxyalkyl group.

* * * * *